United States Patent [19]
Echols et al.

[11] Patent Number: 5,931,232
[45] Date of Patent: Aug. 3, 1999

[54] MECHANICAL CONNECTION BETWEEN BASE PIPE AND SCREEN AND METHOD FOR USE OF THE SAME

[75] Inventors: Ralph H. Echols, Dallas; James D. Hendrickson, Carrollton; Rex D. Presley, Ben Wheeler, all of Tex.

[73] Assignee: Halliburton Energy Services, Inc., Dallas, Tex.

[21] Appl. No.: 08/995,027

[22] Filed: Dec. 19, 1997

Related U.S. Application Data

[62] Division of application No. 08/582,251, Jan. 3, 1996, Pat. No. 5,842,522.

[51] Int. Cl.$^6$ .................................................... E21B 43/08
[52] U.S. Cl. ........................................... 166/378; 166/227
[58] Field of Search .................................. 166/227, 230, 166/231, 232, 233; 29/902, 510, 511, 896.61, 896.62

[56] References Cited

U.S. PATENT DOCUMENTS

| 1,218,848 | 3/1917 | Foster | 166/230 |
| 3,033,783 | 5/1962 | Lubben | 29/896.62 |
| 4,284,138 | 8/1981 | Allred | 166/233 |
| 5,509,483 | 4/1996 | Graen | 166/277 |

*Primary Examiner*—Hoang C. Dang
*Attorney, Agent, or Firm*—Paul I. Herman; Lawrence R. Youst

[57] ABSTRACT

An apparatus for attaching a sand-control screen jacket to a base pipe comprising a base pipe connector securably engaged with the sand-control screen jacket. The base pipe connector having a plurality of protrusions for mechanically securing the base pipe connector to the base pipe thereby securing the sand-control screen jacket to the base pipe. The base pipe connector may further comprises a plurality of sealant ports through which sealant is injected affecting an additional seal between the base pipe connector and the base pipe. The sealant ports may accept a lock pin therein after sealant is injected.

17 Claims, 3 Drawing Sheets

MECHANICAL CONNECTION BETWEEN BASE PIPE AND SCREEN AND METHOD FOR USE OF THE SAME

This application is a division of application Ser. No. 08/582,251 filed on Jan. 3, 1996, now U.S. Pat. No. 5,842,522.

TECHNICAL FIELD OF THE INVENTION

This invention relates in general, to sand-control devices used during the production of oil, gas or water, and in particular to, mechanical apparatuses for attaching a sand-control screen to a base pipe and the methods relating to the use of the same.

BACKGROUND OF THE INVENTION

Since the beginning of oil production from subsurface formations, the industry has been concerned with efficient control of the movement of unconsolidated formations particles, such as sand, into the well bore. For example, such formation movement commonly occurs during production from completions in loose sandstone or following hydraulic fracture of a formation. Production of these materials causes numerous problems in the operation of oil, gas or water wells. These problems include plugged formations, tubing and subsurface flow lines, as well as erosion of casing, downhole equipment and surface equipment. These problems lead to high maintenance costs and unacceptable well downtime. Accordingly, numerous methods have been utilized to control the movement of these unconsolidated formations during the production of fluids.

Gravel packing is one of the most common methods to prevent the production of sand. Generally, gravel packing involves placing pack sand, an aggregate or particulate material, in the annular space between the well bore and a fluid permeable, perforated base pipe that is located adjacent to the production zone. The pack sand is selected to prevent the flow of formation particles therethrough, taking into consideration the characteristics of the particular reservoir. The perforated base pipe is designed to allow production fluids to flow therethrough with minimum resistance, while preventing both the pack sand and the formation particles from flowing into the production string. Gravel packing is commonly achieved by either an open hole gravel packing procedure or an internal gravel packing procedure, depending on the characteristics of the particular reservoir.

In addition to the use of a perforated base pipe and gravel packing, a sand-control screen is commonly employed to control the movement of formation particles. These screens may comprise a continuous single wire mesh wrapped around the base pipe. While this type of screen is capable of excluding even the smallest API grades of pack sand, these screens are easily damaged during handling, installation and production.

More recently, a sand-control screen comprising a screen jacket has been used. The screen jacket is fully formed from a single wire prior to attachment to the base pipe. Commonly, a plurality of rods extend longitudinally along the internal surface of the screen jacket to provide strength to the wire and stand-off between the wire and the base pipe once the screen jacket is attached. Even with the use of screen jackets in conjunction with gravel packing, however, it has been found that formation particles may migrate through the pack sand, eroding channels therethrough. Once these channels are formed, additional formation particles travel therethrough with minimum resistance, thereby continuing the erosion process within the pack sand and allowing formation particles to travel through the screen jacket and enter the interior of the base pipe.

To reduce the possibility of channeling, some screen designs use prepacked sand confined around the perforated base pipe. These prepacked screens are constructed by fabricating the metal components, then forcing pack sand, either resin-coated or uncoated, between the perforated pipe and an inner wire screen or between an inner wire screen and an outer wire screen of a multi-layer screen.

Typically, whether single or multi-layer, conventional or prepacked, the screen jacket is secured to the base pipe by welding. The process for welding a screen jacket to a base pipe, however, is sometimes very difficult due to the difference in metallurgy of the components. For example, the material used for the base pipe may be 13 chrome while the material used for the screen jacket may be a special alloy such as 304 stainless steel, 316 stainless steel, Hastelloy, Inconel, or Monel. Due to the difficulty of the welding process and the post-weld heat treatment, which is required due to the differences in metallurgy of the screen jacket and the base pipe, there have been numerous failures in the connection between screen jackets and base pipes. For example, cracking within the welds as well as in the heat affected zone has been noted.

In addition, both the welding process and the post-weld heat treatment have resulted in a poor sealing between the screen jacket and the base pipe. The use of typical elastomeric seals has proven to be inadequate due to their inability to withstand the high temperatures required during these processes. This lack of an adequate seal may result in longitudinal flow of production fluids and more critically, formation particles between the screen jacket and the base pipe.

Therefore, a need has arisen for an apparatus and a method for attaching a sand-control screen jacket to a base pipe that does not require welding and that allows for a seal between the screen jacket and the base pipe. A need has also arisen for an apparatus that is simple and cost-effective to manufacture and assemble and which is capable of withstanding severe downhole conditions during installation and production.

SUMMARY OF THE INVENTION

The present invention disclosed herein comprises a base pipe connector that is securably engaged with a screen jacket connector of a sand-control screen jacket that mechanically connects the sand-control screen jacket to a perforated base pipe, while allowing for a seal between the sand-control screen jacket and the base pipe and withstanding severe downhole conditions during installation and production.

In one embodiment of the present invention, a crimping collar is integral with the base pipe connector on the end opposite the sand-control screen jacket. A plurality of protrusions are located on the interior surface of the crimping collar for engaging the base pipe. The crimping collar is mechanically deformed to engage the base pipe and secure the sand-control screen jacket to the base pipe.

In another embodiment of the present invention, an internal slip member is slidably disposed between the base pipe connector and the base pipe. A plurality of channels extend radially inward around the inner surface of the internal slip member for engaging the base pipe. A jam nut is securably engaged with the base pipe connector at the end opposite the screen jacket connector such that the internal slip member slides toward the base pipe connector. As the internal slip member slides toward the base pipe connector, the friction between the channels of the internal slip member and the base pipe is sufficiently increased to secure the sand-control screen jacket to the base pipe.

A wave spring may be disposed between the jam nut and the internal slip member to bias the internal slip member in the direction of the base pipe connector, further increasing the friction between the channels of the internal slip member and the base pipe, thereby further securing the sand-control screen jacket to the base pipe.

In either embodiment, the base pipe connector may further define a plurality of sealant ports. Sealant is injected through the plurality of sealant ports into the annular space between the perforated base pipe and the base pipe connector. The sealant affects an additional seal between the base pipe connector and the base pipe, thereby helping eliminating fluid and sand flow between the base pipe connector and the base pipe. A plurality of lock pins may be inserted into the plurality of sealant ports once sealant has been injected between the base pipe and the base pipe connector. The plurality of lock pins mechanically prevents further communication between the well bore and the base pipe through the plurality of sealant ports.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

Figure 1:
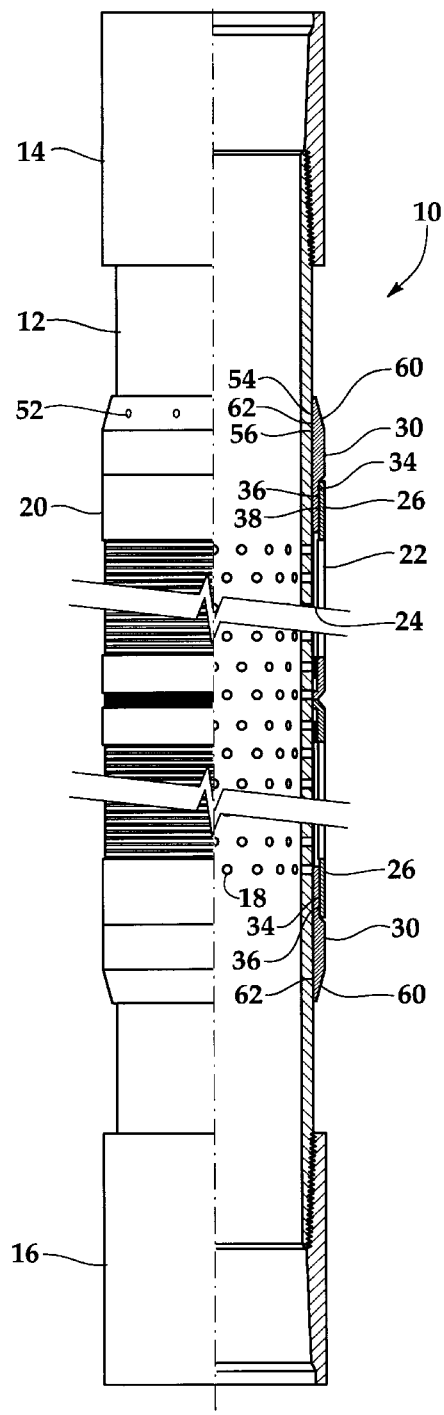
FIG. 1 is a quarter-sectional view of a sand-control screen jacket mechanically attached to a base pipe.

Referring to FIG. 1, a sand-control screen jacket 20 is mechanically connected to a base pipe 12 and is generally designated 10. Base pipe 12 is threadably coupled to a collar 14 and a collar 16 on either end of base pipe 12. Collar 14 and collar 16 are threadably engaged with a pipe string (not shown) used during the production of oil, gas or water. Base pipe 12 has a plurality of perforations 18 through which oil, gas or water enters the interior of the base pipe 12. The number, size and shape of perforations 18 are not critical for purposes of this invention, so long as sufficient area is provided for sufficient fluid production and pipe integrity is maintained. Surrounding base pipe 12 is a sand-control screen jacket 20. Sand-control screen jacket 20 has an outer screen 22 and an inner screen 24. The number of screens and the exact design of the sand-control screen jacket is not critical, so long as it provides sufficient control of the movement of unconsolidated sands therethrough. Sand-control screen jacket 20 may have prepacked sand between outer screen 22 and inner screen 24. It should therefore be recognized that the exact construction of the screen may vary within the scope of the present invention.

Sand-control screen jacket 20 has a screen jacket connector 26 on either end. Each screen jacket connector 26 is threadably coupled to a base pipe connector 30 to secure sand-control screen jacket 20 to base pipe 12. Integrally extending from base pipe connector 30 is a crimping collar 60. Crimping collar 60 has a plurality of protrusions 62 on the inner diameter of crimping collar 60.

Inner threads 34 of screen jacket connector 26 engage outer threads 36 of base pipe connector 30. A thread locking compound 38 is provided between inner threads 34 and outer threads 36 to seal inner threads 34 and outer threads 36 together. Thread locking compounding 38 may be Loc-Tite or a similar compound. Even though FIG. 1 depicts a threadable connection between screen jacket connector 26 and base pipe connector 30, it should be understood by one skilled in the art that a variety of additional connecting means are equally well-suited for the present invention including, but not limited to, welding.

Base pipe connector 30 has a plurality of sealant ports 52. Sealant 54 is injected into annular space 56 between base pipe connector 30 and base pipe 12 to affect an additional seal between base pipe connector 30 and base pipe 12, thereby ensuring that production fluids do not travel longitudinally between base pipe connector 30 and base pipe 12. Sealant 54 may be Masterbond or some equivalent thereof. Once sealant 54 is injected between base pipe connector 30 and base pipe 12, a plurality of lock pins (not shown) are placed within sealant ports 52.

Alternatively, an elastomeric O-ring (not shown) may be utilized to affect a seal between base pipe connector 30 and base pipe 12 or an elastomeric O-ring (not shown) may be used in conjunction with sealant 54, to create a redundant seal between base pipe connector 30 and base pipe 12.

Figure 2:
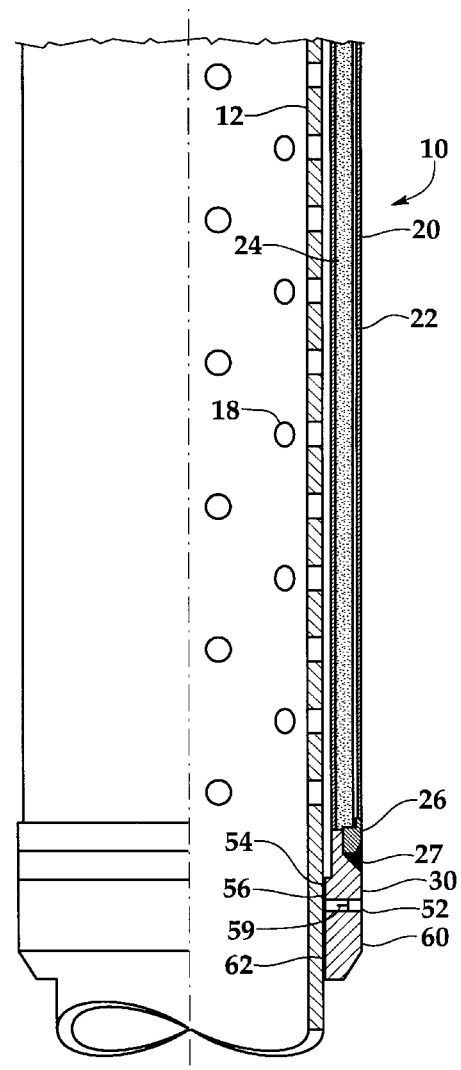
FIG. 2 is an enlarged quarter-sectional view of one embodiment of the present invention showing a sand-control screen jacket and a base pipe after crimping.

Referring to FIG. 2, an enlarged quarter-sectional view of the sand-control screen jacket attachment system 10 of the present invention is illustrated. Sand-control screen jacket 20 is placed around base pipe 12 such that outer screen 22 and inner screen 24 surround perforations 18. Base pipe connector 30 is securably engaged with screen jacket connector 26 at weld 27. Integrally extending from base pipe connector 30 is crimping collar 60. Crimping collar 60 has a plurality of protrusions 62 on the inner diameter of crimping collar 60. The process for "crimping" or mechanically deforming crimping collar 60 onto base pipe 12 as used in the present invention is commonly understood in the art.

Following the crimping process, sealant 54 may be injected through sealant ports 52 into annular space 56 to affect an additional seal between base pipe connector 30 and base pipe 12. Once sealant 54 is injected between base pipe connector 30 and base pipe 12, a plurality of lock pins 59 are placed into sealant ports 52. A sleeve (not shown) may be placed about crimping collar 60 to protect crimping collar 60 during installation as well as during production.

Figures 3, 4:
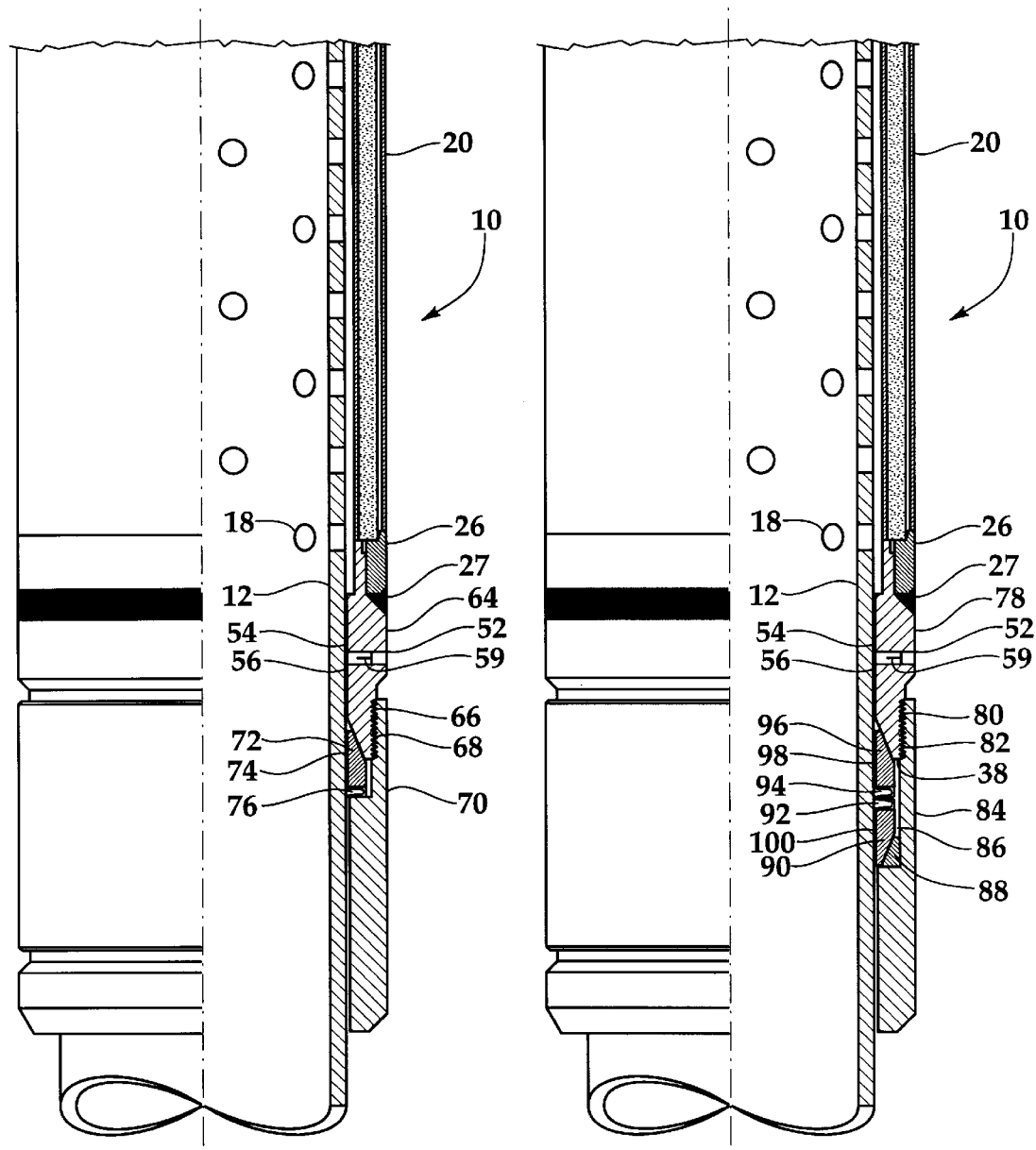
FIG. 3 is an enlarged quarter-sectional view of one embodiment of the present invention in which internal slips are used to connect a sand-control screen jacket to a base pipe.
FIG. 4 is an enlarged quarter-sectional view of a second embodiment of the present invention in which internal slips are used to connect a sand-control screen jacket to a base pipe.

Referring to FIG. 3, a quarter-sectional view of an alternate embodiment of the sand-control screen jacket attachment system 10 of the present invention is illustrated. A base pipe connector 64 is securably engaged with screen jacket connector 26 of screen jacket 20. On the end opposite of screen jacket connector 26, base pipe connector 64 has external threads 66 which engage with internal threads 68 of a jam nut 70. Thread locking compound 38 is placed between external threads 66 and internal threads 68 to affect a seal therebetween.

An internal slip member 72 is disposed between base pipe connector 64 and base pipe 12. Internal slip member 72 may be a plurality of internal slips or a c-ring. Internal slip member 72 has a plurality of channels 74 extending radially inward around the inner diameter of internal slip member 72.

A wave spring 76 is disposed between internal slip member 72 and jam nut 70 to bias internal slip member 72 toward base pipe connector 64. As jam nut 70 is rotated in a clockwise direction, jam nut 70 moves axially in the direction of base pipe connector 64 causing internal slip member 72 to slide toward base pipe connector 64, thereby increasing the friction between internal slip member 72 and base pipe 12 and securing sand-control screen jacket 20 to base pipe 12. Base pipe connector 64 has sealant ports 52 through which sealant 54 is injected into annular space 56. Once sealant 54 is injected between base pipe connector 64 and base pipe 12, a plurality of lock pins 59 are placed into sealant ports 52.

Referring now to FIG. 4, a quarter-sectional view of an alternate embodiment of the sand-control screen jacket attachment system 10 of the present invention is pictured. Base pipe connector 78 is securably connected with screen jacket connector 26. At the end opposite screen jacket connector 26, base pipe connector 78 has external threads 80 that are threadably connected with internal threads 82 of a jam nut 84. Between external threads 80 and internal threads 82 is thread locking compound 38.

Between base pipe connector 78, jam nut 84, and base pipe 12 is an annular space 86. In annular space 86 is an internal slip wedge 88, an internal slip 90, a wave spring 92, a wave spring 94, and an internal slip 96. Internal slip 96 has a plurality of channels 98 extending radially inward around the inner diameter of internal slip 96. Internal slip 90 has a plurality of channels 100 extending radially inward around the inner diameter of internal slip 90. Wave spring 92 and wave spring 94 load internal slip 90 and internal slip 96.

As jam nut 84 is rotated clockwise, jam nut 84 moves axially in the direction of base pipe connector 78 forcing internal slip wedge 88 toward internal slip 90, thereby increasing the friction between internal slip 90 and base pipe 12. As jam nut 84 is rotated clockwise, internal slip 96 is forced toward base pipe connector 78 increasing the friction between internal slip 96 and base pipe 12. Internal slip 90 and internal slip 96 are aligned such that they anchor base pipe connector 78 to base pipe 12 preventing axial movement in both directions, thereby securing screen jacket 20 to base pipe 12. Base pipe connector 78 has sealant ports 52 through which sealant 54 is injected into annular space 56 to affect an additional seal between base pipe connector 78 and base pipe 12. Once sealant 54 is injected between base pipe connector 78 and base pipe 12, a plurality of lock pins 59 are placed into sealant ports 52.

Figure 5:
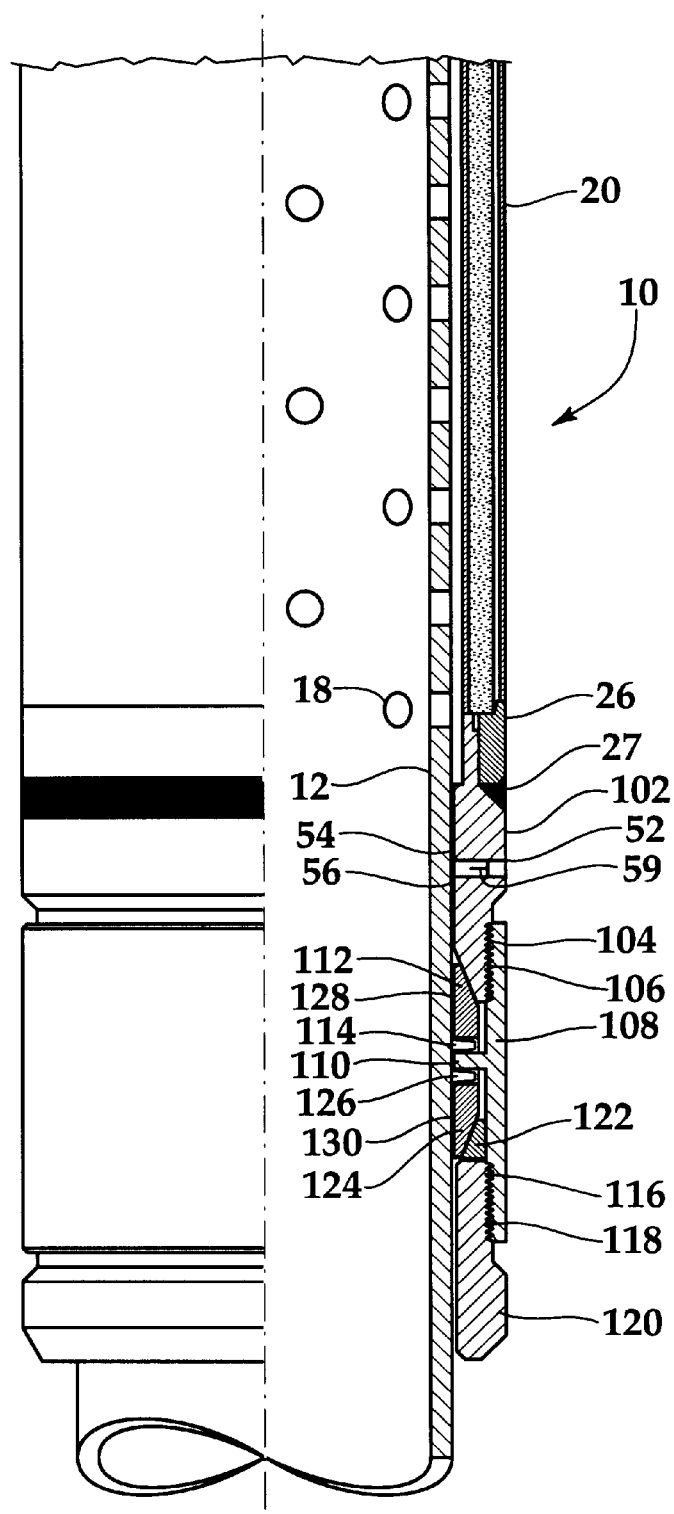
FIG. 5 is an enlarged quarter-sectional view of a third embodiment of the present invention in which internal slips are used to connect a sand-control screen jacket to a base pipe.

Referring to FIG. 5, a quarter-sectional view of an alternate embodiment of the sand-control screen jacket attachment system 10 of the present invention is pictured. A base pipe connector 102 is securably engaged with screen jacket connector 26. At the end opposite screen jacket connector 26, base pipe connector 102 has external threads 104 which couple with internal threads 106 of a housing 108. A spacer 110 is integral with housing 108 having a reduced inner diameter. Between spacer 110 and base pipe connector 102 are an internal slip 112 and a wave spring 114, that biases internal slip 112 toward base pipe connector 102. As housing 108 is rotated clockwise, housing 108 moves axially in the direction of base pipe connector 102 forcing internal slip 112 against base pipe connector 102, thereby increasing the friction between internal slip 112 and base pipe 12.

At the end opposite base pipe connector 102, housing 108 has internal threads 116 that couple with external threads 118 of a jam nut 120. Between jam nut 120 and spacer 110 are an internal slip wedge 122, an internal slip 124 and a wave spring 126 that biases internal slip 124 against internal slip wedge 122. As jam nut 120 is rotated in a clockwise direction, jam nut 120 moves axially in the direction of base pipe connector 102 forcing internal slip wedge 122 against internal slip 124, thereby increasing the friction between internal slip 124 and base pipe 12.

Internal slip 112 has a plurality of channels 128 extending radially inward around the inner diameter of internal slip 112. Internal slip 124 has a plurality of channels 130 extending radially inward around the inner diameter of internal slip 124. Internal slip 112 and internal slip 124 are aligned such that they anchor base pipe connector 102 to base pipe 12 preventing axial movement in both directions which, in turn, secures screen jacket 20 to base pipe 12. Base pipe connector 102 has a plurality of sealant ports 52 through which sealant 54 is injected into annular space 56, thereby affecting an additional seal between base pipe connector 102 and base pipe 12. Once sealant 54 is injected between base pipe connector 102 and base pipe 12, a plurality of lock pins 59 are placed into sealant ports 52.

In operation, the present invention involves mechanically securing a sand-control screen jacket 20 to a base pipe 12. The base pipe 12 is designed to allow production fluids to enter the interior of the base pipe 12 with minimum resistance, while maintaining pipe integrity. A screen jacket connector 26 is secured to both ends of the sand-control screen jacket 20 which is then placed around the perforations 18 of the base pipe 12 by sliding the sand-control screen jacket 20 with the screen jacket connectors 26 onto the base pipe 12. A base pipe connector 30 is then secured to each of the screen jacket connectors 26.

In one embodiment, as shown in FIGS. 1 and 2, a crimping collar 60 integrally extends from each of the base pipe connectors 30. The crimping collars 60 are mechanically crimped around the base pipe 12 using a crimping process that is commonly understood in the art. The crimping collars 60 anchor the base pipe connectors 30 to the base pipe 12 which, in turn, secures the sand-control screen jacket 20 to the base pipe 12.

In another embodiment, as shown in FIG. 5, a housing 108 having a spacer 110 with a reduced inner diameter is threaded onto each of the base pipe connectors 102. An internal slip 112 and a wave spring 114 are placed between each of the spacers 110 and their corresponding base pipe connectors 102 prior to threading the housings 108 to the base pipe connectors 102. As the housings 108 are threaded onto the base pipe connectors 102, the housings 108 move axially into the wave springs 114 and the internal slips 112, forcing the internal slips 112 against the base pipe connectors 102 and the base pipe 12, thereby increasing the friction between the internal slips 112 and the base pipe 12.

A jam nut 120 is threaded onto each of the housings 108 on the end opposite the base pipe connectors 102. An internal slip wedge 122, an internal slip 124 and a wave spring 126 are placed between the spacers 110 of the housings 108 and the jam nuts 120 prior to threading the jam nuts 120 onto the housings 108. As the jam nuts 120 are threaded onto the housings 108 the jam nuts 120 move axially into the internal slip wedges 122, thereby forcing the internal slips 124 against the wave springs 126 and against the base pipe 12, increasing the friction between the internal slips 124 and the base pipe 12.

Each of the internal slips 112, 124 has channels 128, 130 respectively extending radially inward around their inner diameter. The channels 128 of the internal slips 112 are placed in the opposite direction from the channels 130 of the internal slips 124 so that the base pipe connectors 102 are anchored to the base pipe 12, such that axial movement in both directions is prevented, thereby securing the sand-control screen jacket 20 to the base pipe 12.

The base pipe connectors 102 may further define a plurality of sealant ports 52. Sealant 54 is injected through the sealant ports 52 into the annular space 56 between the base pipe connectors 102 and the base pipe 12 to affect an additional seal between the base pipe connectors 102 and the base pipe 12. Lock pins 59 may be placed into the sealant ports 52 after the sealant 54 is injected between the base pipe connectors 102 and the base pipe 12. Alternatively, an elastomeric O-ring may be utilized to affect a seal between the base pipe connectors 102 and the base pipe 12, or an elastomeric O-ring may be used in conjunction with the sealant 54 that is injected between the base pipe connectors 102 and the base pipe 12, creating a redundant seal. Each of these methods for affecting an additional seal between the base pipe connectors 102 and the base pipe 12 prevent production fluids and sand from traveling longitudinally between the base pipe connectors 102 and the base pipe 12.

After assembly, the base pipe 12 along with the sand-control screen jacket 20, which is mechanically connected thereon, is threadably attached onto a production tubing string. The tubing string is tripped into the well bore, aligning the sand-control screen jacket 20 and the perforated base pipe 12 with the production zone. Fluids are produced through the sand-control screen jacket 20 and base pipe 12 into the tubing string, while sand and other unconsolidated formation particles are filtered out of the fluid.

Therefore, the apparatus for attaching a sand-control screen jacket to a base pipe and method for use of the same has inherent advantages over the prior art. While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. An apparatus for securing a sand-control screen jacket to a base pipe comprising:

a base pipe connector securably engaging the sand-control screen jacket; and a crimping collar integrally connected to the base pipe connector having a plurality of protrusions for engaging the base pipe to secure the sand-control screen jacket to the base pipe when the crimping collar is mechanically deformed such that the protrusions frictionally contact the base pipe.

2. The apparatus as recited in claim 1 wherein said base pipe connector has a plurality of sealant ports for injecting sealant between the base pipe and said base pipe connector.

3. The apparatus recited in claim 2 further comprising a plurality of lock pins disposed within said plurality of sealant ports.

4. The apparatus recited in claim 1 further comprising at least one O-ring disposed between the base pipe and said base pipe connector.

5. The apparatus as recited in claim 1 further comprising a sleeve disposed about said crimping collar.

6. The apparatus as recited in claim 1 further comprising a screen jacket connector axially extending from the sand-control screen jacket, the screen jacket connector securably engageable with the base pipe connector.

7. The apparatus as recited in claim 6 wherein the screen jacket connector is threadably engageable with the base pipe connector.

8. The apparatus as recited in claim 6 wherein the screen jacket connector is welded to the base pipe connector.

9. An apparatus for securing a sand-control screen jacket to a base pipe comprising:

a screen jacket connector axially extending from the sand-control screen jacket;

a base pipe connector securably engageable with the screen jacket connector; and a crimping collar integrally connected to the base pipe connector having a plurality of protrusions for engaging the base pipe to secure the sand-control screen jacket to the base pipe when the crimping collar is mechanically deformed such that the protrusions frictionally contact the base pipe.

10. The apparatus as recited in claim 9 wherein the base pipe connector has a plurality of sealant ports for injecting sealant between the base pipe and the base pipe connector.

11. The apparatus as recited in claim 10 further comprising a plurality of lock pins disposed within the plurality of sealant ports.

12. The apparatus as recited in claim 9 further comprising at least one O-ring disposed between the base pipe and the base pipe connector.

13. The apparatus as recited in claim 9 wherein the screen jacket connector is threadably engageable with the base pipe connector.

14. The apparatus as recited in claim 9 wherein the screen jacket connector is welded to the base pipe connector.

15. A method for attaching a sand-control screen jacket to a base pipe comprising the steps of:

securably attaching a base pipe connector having a crimping collar to the sand-control screen jacket; and mechanically deforming the crimping collar to create frictional contact between protrusions of the crimping collar and the base pipe.

16. The method as recited in claim 15 further comprising the step of injecting a sealant between the base pipe connector and the base pipe through a plurality of sealant ports in the base pipe connector.

17. The method as recited in claim 16 further comprising the step of inserting a lock pin in each of the plurality of sealant ports in the base pipe connector.

* * * * *

UNITED STATES PATENT AND TRADEMARK OFFICE
CERTIFICATE OF CORRECTION

PATENT NO. : 5,931,232
DATED : August 3, 1999
INVENTOR(S) : Echols, et al

It is certified that error appears in the above-identified patent and that said Letters Patent are hereby corrected as shown below:

Title Page, Item [75], Inventors: Delete "Rex D. Presley, Ben Wheeler, all of Tex." and substitute --both of Tex.--

Signed and Sealed this

Seventeenth Day of April, 2001

Attest:

NICHOLAS P. GODICI

Attesting Officer     Acting Director of the United States Patent and Trademark Office